US012784002B1

(12) United States Patent
Kumar et al.

(10) Patent No.: US 12,784,002 B1
(45) Date of Patent: Nov. 3, 2026

(54) MULTI-DEVICE PROCTORING

(71) Applicant: Glider AI, Inc., Fremont, CA (US)

(72) Inventors: Satish Kumar, Union City, CA (US); Nupin R. Pillai, Bengaluru (IN)

(73) Assignee: Glider AI, Inc., Fremont, CA (US)

( * ) Notice: Subject to any disclaimer, the term of this patent is extended or adjusted under 35 U.S.C. 154(b) by 168 days.

(21) Appl. No.: 18/132,329

(22) Filed: Apr. 7, 2023

Related U.S. Application Data

(60) Provisional application No. 63/329,121, filed on Apr. 8, 2022.

(51) Int. Cl.
*G06Q 10/1053* (2023.01)

(52) U.S. Cl.
CPC ................................ *G06Q 10/1053* (2013.01)

(58) Field of Classification Search
CPC ..... G06Q 10/1053; G06Q 50/20; G06Q 50/26
See application file for complete search history.

(56) References Cited

U.S. PATENT DOCUMENTS

| | | | | |
|---|---|---|---|---|
| 11,238,751 | B1 * | 2/2022 | Addae | G09B 7/02 |
| 11,645,935 | B1 * | 5/2023 | Smetters | G06V 40/168 |
| 12,236,803 | B1 * | 2/2025 | Parsont | H04N 7/183 |
| 2013/0209982 | A1 * | 8/2013 | Rooks | G09B 7/00 434/350 |
| 2015/0037781 | A1 * | 2/2015 | Breed | G09B 7/00 434/362 |
| 2017/0263141 | A1 * | 9/2017 | Possick | G09B 7/00 |
| 2018/0225982 | A1 * | 8/2018 | Jaeh | G09B 5/00 |
| 2020/0267185 | A1 * | 8/2020 | Smyth | H04L 63/0236 |
| 2023/0274656 | A1 * | 8/2023 | Azim | G06Q 50/20 434/350 |

FOREIGN PATENT DOCUMENTS

| | | | | |
|---|---|---|---|---|
| CN | 107566439 A | * | 1/2018 | |
| CN | 109656799 A | * | 4/2019 | G06F 11/3688 |
| KR | 20220017329 A | * | 2/2022 | G10L 15/02 |

OTHER PUBLICATIONS

Li, Yuan(2012), âPower Conservation Methods for Real-time Wireless Video Transfer Applications, University of Nevada, Reno. ProQuest Dissertations & Theses, 2012. 3511983. Database: ProQuest (Year: 2012).*

Proctortrack, NPL, 2022, Proctorlock, https://web.archive.org/web/20220311004136/https://proctortrack.com/proctorlock/ (Year: 2022).*

* cited by examiner

*Primary Examiner* — Jessica Lemieux
*Assistant Examiner* — Nico L Padua
(74) *Attorney, Agent, or Firm* — Vista IP Law Group, LLP

(57) ABSTRACT

Some embodiments of the invention are directed to an improved approach to implement online assessment mechanisms which would preclude or minimize unauthorized activities during an assessment. The user of an assessment session is blocked from accessing unauthorized mobile applications or mobile activities.

20 Claims, 17 Drawing Sheets

202

MULTI-DEVICE PROCTORING

CROSS-REFERENCE TO RELATED APPLICATIONS

The present application claims the benefit of priority to U.S. Provisional No. 63/329,121, filed on Apr. 8, 2022, the contents of which are hereby incorporated by reference in their entirety.

BACKGROUND

There has been a tremendous growth in the use of online assessment tools for any number of fields and industry applications. Such online assessment tools are used to provide a mechanism to implement assessment of users and individuals. The online assessment tool may be used to provide an assessment of the skills or capabilities of an individual in any given domain or field.

For example, pre-employment assessments have become an important use case for online assessment tools. For an open job position, recruiters often invite candidates to take assessments to gauge their skills. These assessments need to be supervised or invigilated to ensure the integrity of the test submission in a safe test-taking environment.

It has been observed that candidates may sometimes use mobile devices during the online assessment to indulge in non-permitted activities during the assessment. For example, a user of the online assessment tool may engage in fraudulent activities and/or collaborate with or take help from others to answer questions.

Indeed, it has been observed that mobile devices have been used to engage in numerous unauthorized activities during an assessment. Mobile devices have been used for various unfair practices such as: (a) searching for answers directly on the internet on mobile browsers; (b) sending screenshots of questions through text/WhatsApp to friends to get help; (c) keeping someone on a call to guide through the assessment response; (d) live streaming the assessment questions on a laptop screen through the camera of a mobile device and receiving help in answering questions; or (e) engaging in live conversations over the phone to answer questions. Candidates have also been observed to keep mobile devices out of webcam frames to avoid being caught in webcam videos.

Therefore, there is a need for an improved approach to implement online assessment tools which can obviate the use of mobile devices for non-permitted activities during assessments.

SUMMARY

Some embodiments of the invention are directed to an improved approach to implement online assessment mechanisms which would preclude or minimize unauthorized activities during an assessment.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

In order that the present invention is better understood, some embodiments of the invention will now be described, by way of example only, with reference to the accompanying drawings.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Some embodiments of the invention are directed to an improved approach to implement online assessment mechanisms which would preclude or minimize unauthorized activities using as mobile device during an assessment.

Figure 1:
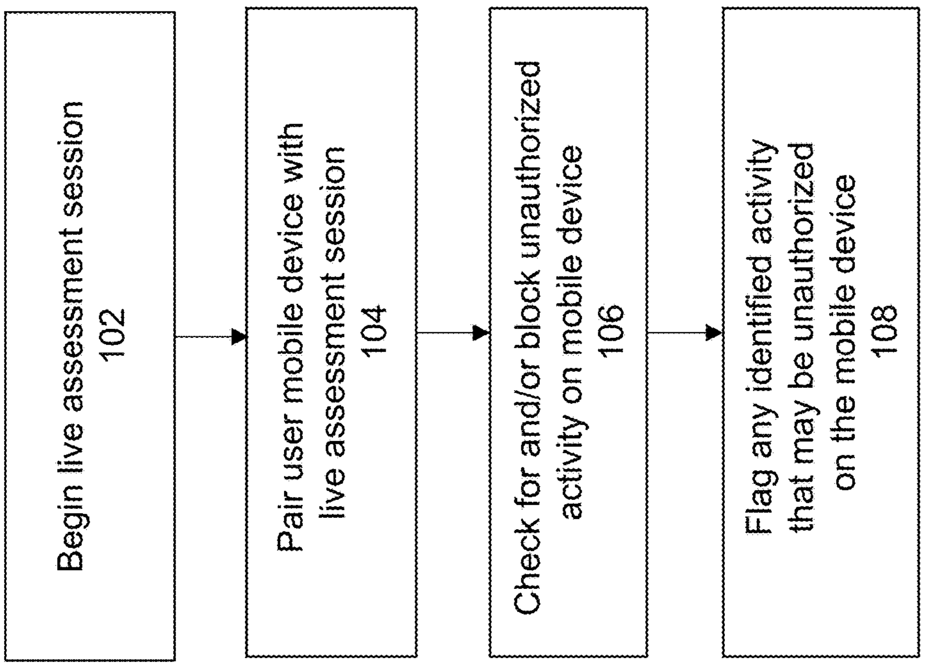
FIG. 1 shows a high-level flowchart of an approach to implement some embodiments of the invention.

FIG. 1 shows a high-level flowchart of an approach to implement some embodiments of the invention. At 102, a live assessment session is started, e.g., from a computing station operated by a user, individual, and/or candidate that is undergoing the assessment. The user station and/or other computing device operated by the user/candidate comprises any type of computing station that may be used to operate, interface with, or implement an assessment session or application. Examples of such computing devices include for example, servers, workstations, personal computers, or remote computing terminals connected to a networked or cloud-based computing platform. The user station may comprise one or more input devices for the user to provide operational control over the activities of the system, such as a mouse or keyboard to manipulate a pointing object. The system may also be associated with a display device, such as a display monitor, for displaying information pages or content to users of the computing system.

At 104, the user/candidate's mobile device is paired with the live assessment session on the user's user station/laptop. Any suitable approach may be employed to pair the mobile device with the live assessment session. In some embodiments, a QR code is employed to implement the pairing actions.

At 106, the user/candidate is blocked from accessing other mobile applications for possible unfair activities. For the assessment duration, the candidate is expected to stay on a specific page on the mobile device that is connected to the assessment session on the laptop. Any attempt to move out of the active page on the mobile device will trigger a warning message on the live ongoing assessment session on the laptop. The candidate is notified to get out of other applications on the mobile and go back to the active page to continue the assessment.

At 108, the candidates are flagged for any identified suspicious activities. In some embodiments, the user/candidate may be suspended from the assessment session if exceeding the maximum allowed number of violations during the assessment period. In further embodiments, the candidates may be allowed certain exceptions to mobile activities, e.g., to receive or place emergency calls during the assessment period.

During a setup phase, a prebuilt assessment or a custom assessment can be configured to permit multi-device proctoring (MDP). A configuration setting can be implemented that enables an option to implement multi-device proctoring with a mobile device/phone. In addition, a configuration can be made to set a limit on the number of times that the user can leave the lock page on the mobile devices. Another configuration can be set for a time for if the candidate leaves the lock page on the mobile device, where the assessment session is terminated after the configured time period. In addition, a configuration can be made where if a candidate leaves the mobile screen for more than the entered value/time, the candidate will be blocked from continuing with the assessment.

Figure 2:
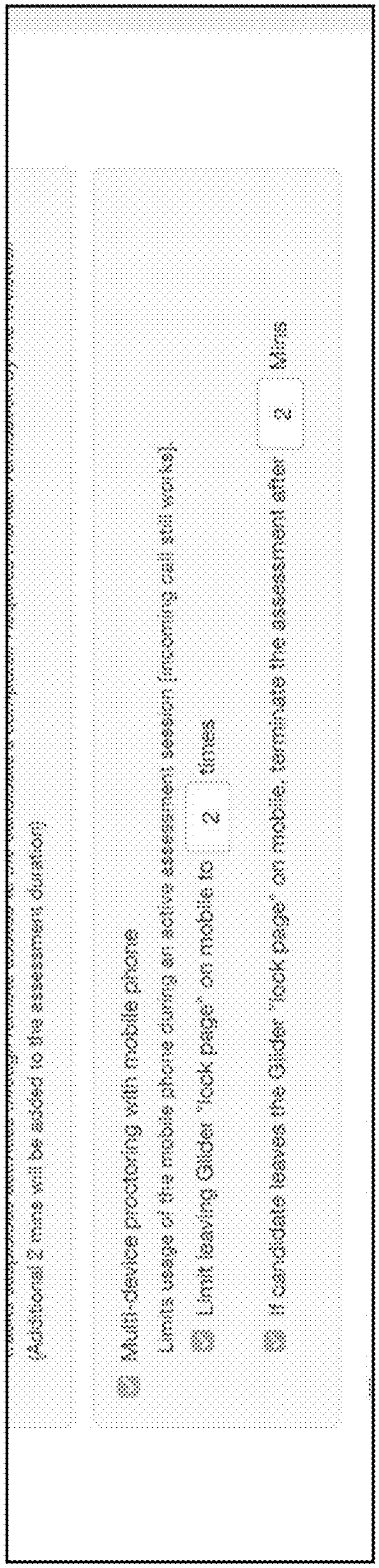
FIG. 2 shows an example interface 202 for implement some of all of these configurations.

FIG. 2 shows an example interface 202 for implement some of all of these configurations. This interface includes interface portions/controls to: (a) enter a value for "Limit leaving lock page on mobile to [ ] times"; (b) enter a time for "If candidate leaves the 'lock page' on mobile, terminate the assessment after [ ] Mins"; and/or (c) if a candidate leaves the mobile screen for more than the entered value/time, the candidate will be blocked from continuing with the assessment.

Figure 3:
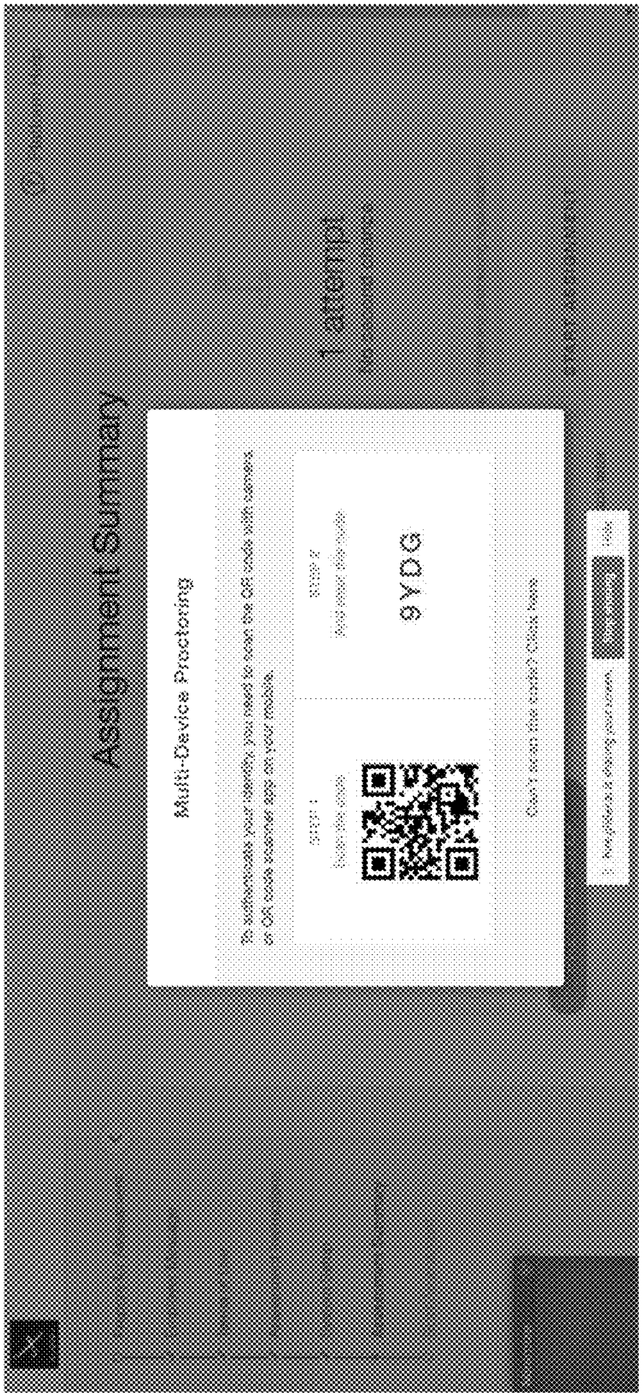
FIGS. 3-11 provide illustrative examples of interface components and assessment event processing.
Figure 4:
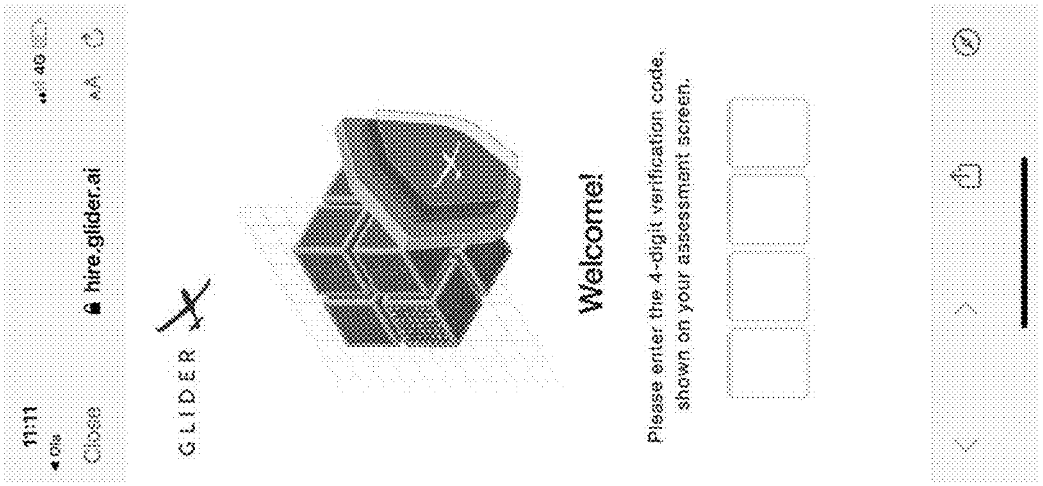
Figure 5:
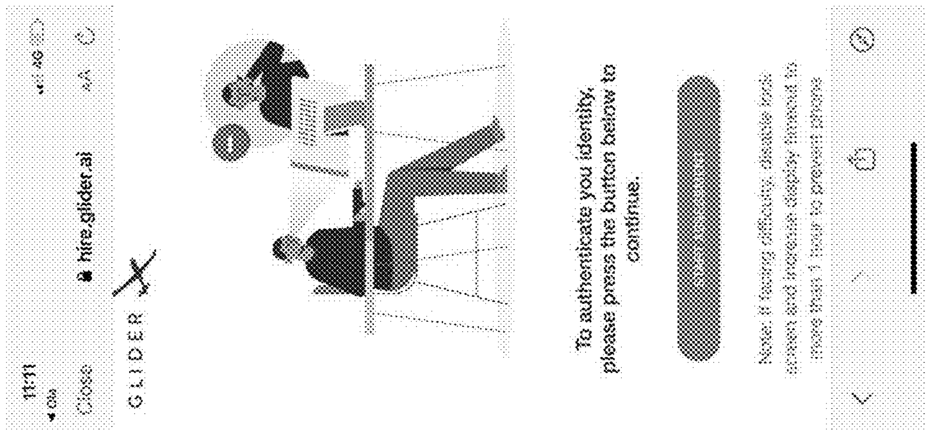
Figure 6:
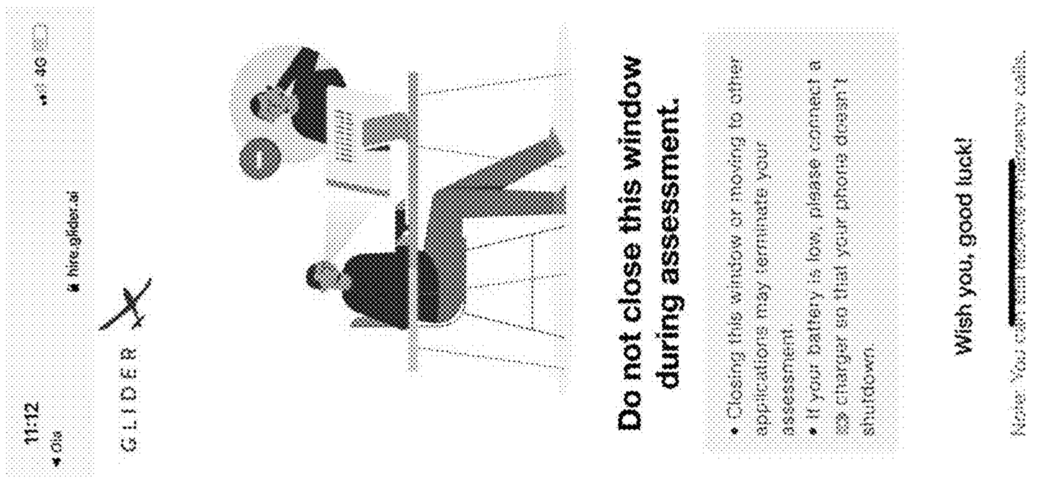

Before the launch of the assessment during the set-up phase, the candidate will implement a candidate set-up phase. The candidate is presented with a QR code and a verification code in a user interface, e.g., as shown in FIG. 3. The candidate is requested to scan the QR code using a mobile phone. In some embodiments, the QR code corresponds to a machine-scannable image that will be read using the smartphone camera and will direct the candidate to either open the main screen page in a browser or install a native application on the mobile device. In either in the mobile browser or in the native application, the main screen page presents fields to enter the 4-digit verification code available on the assessment pop-up window on the laptop, e.g., as shown in FIG. 4. On entering the 4-digit verification code, the candidate is taken to Start Assessment page on the mobile device, e.g., as shown in FIG. 5. Once the candidate clicks on [Start Assessment] on the mobile device, the candidate will be able to resume the assessment on the user/candidate's computing device/laptop (FIG. 6). The mobile device will be placed in a No Sleep Mode (e.g., where the mobile screen will not go to sleep or will not lock).

Figure 7:
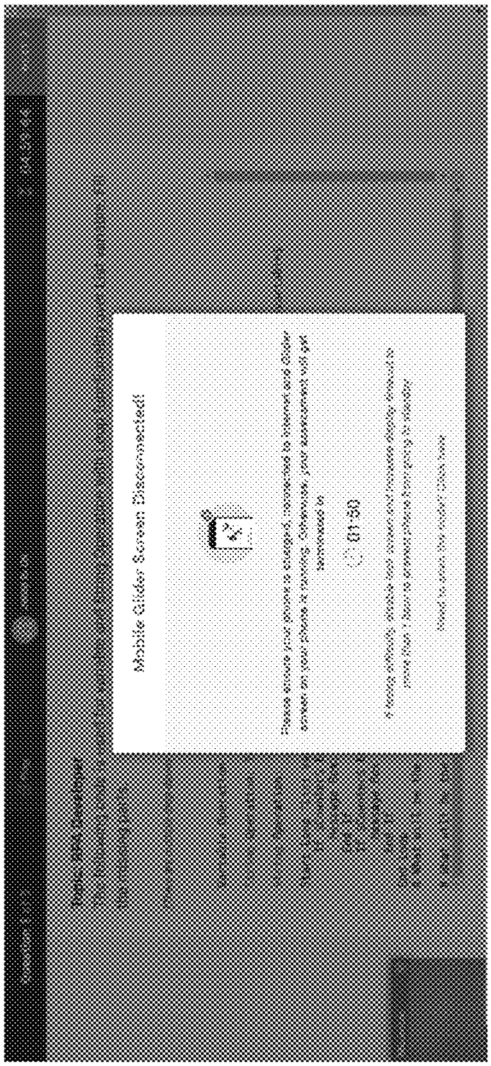
Figure 8:
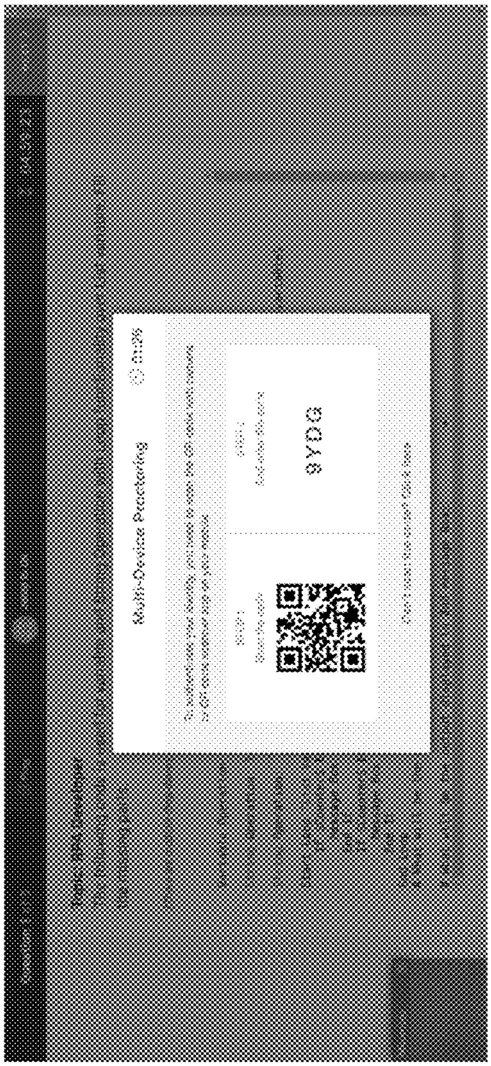

Certain operations will occur with regards to the candidate activity during the assessment. If the candidate moves to any other application/browser on the mobile device, a pop-up will be shown in the live assessment UI on the laptop, requesting the candidate to go back to the main proctoring screen page (main screen page or screen page) on the mobile device. A countdown is shown on the laptop screen for the candidate to reopen the main screen page on the mobile device, e.g., as shown in FIG. 7. The candidate is expected to go back to the main screen page on the mobile device and/or or to scan the bar code again to enter the verification code within the specified duration, e.g., as shown in FIG. 8.

Figure 9:
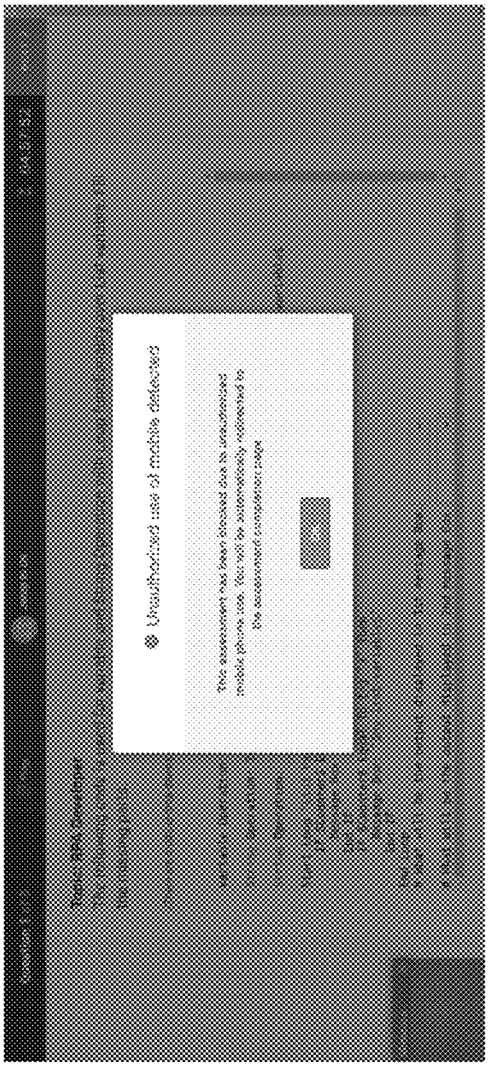
Figure 10:
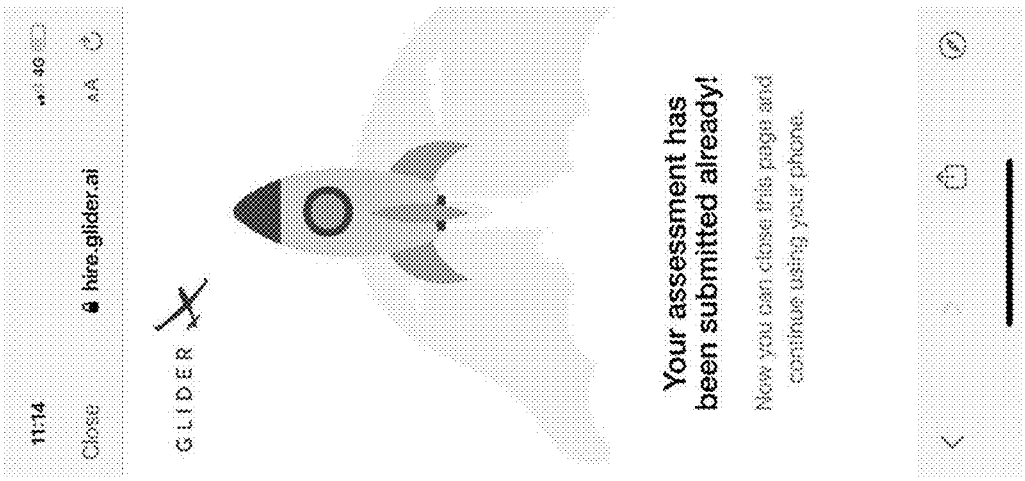

If the candidate remains outside the main screen page/UI on the mobile device above the specified time represented by the countdown on the laptop screen, and/or if the candidate continues to access other applications/browsers on the mobile device above the allowed limit, then the candidate may be blocked from continuing with the assessment and sent to the system/recruiter for review. This is illustrated in FIG. 9. Once complete, the assessment can be submitted, e.g., as shown in FIG. 10.

Figure 11:
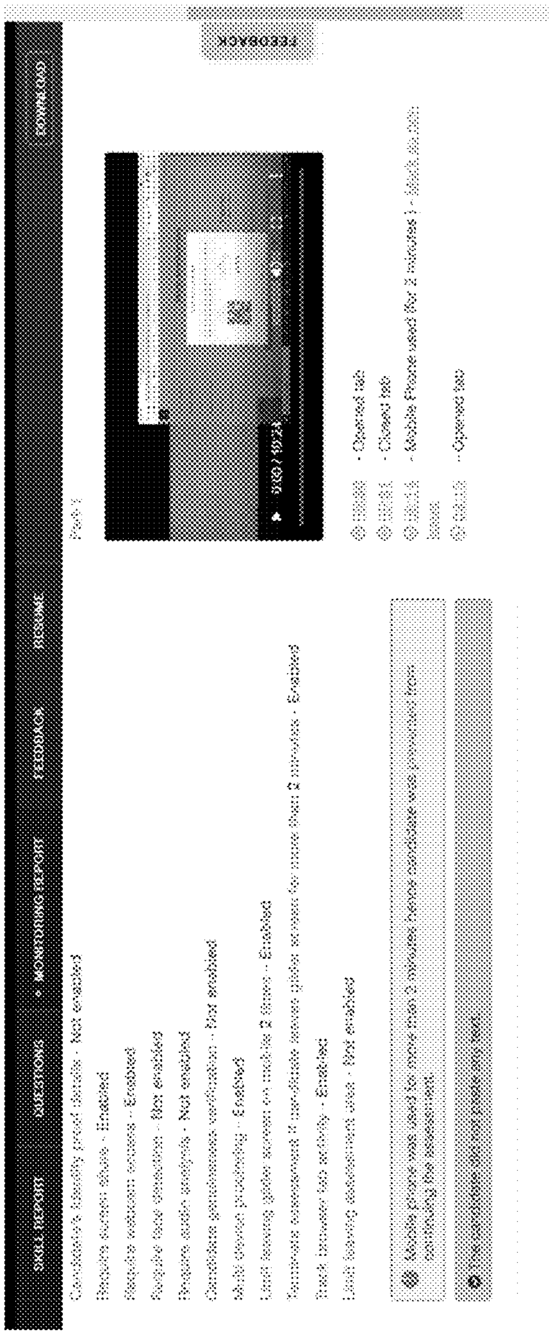

On assessment submission, a candidate skill report is generated for the hiring team to review. In this report, candidate activity during the assessment period is presented. It summarizes the number of times the candidate visited other applications on the mobile and the time spent during each violation along with the timestamp. The video proctoring through the laptop webcam also records the candidate's activities and is reconciled with the activities on the mobile phone, e.g., as shown in FIG. 11.

Figure 13:
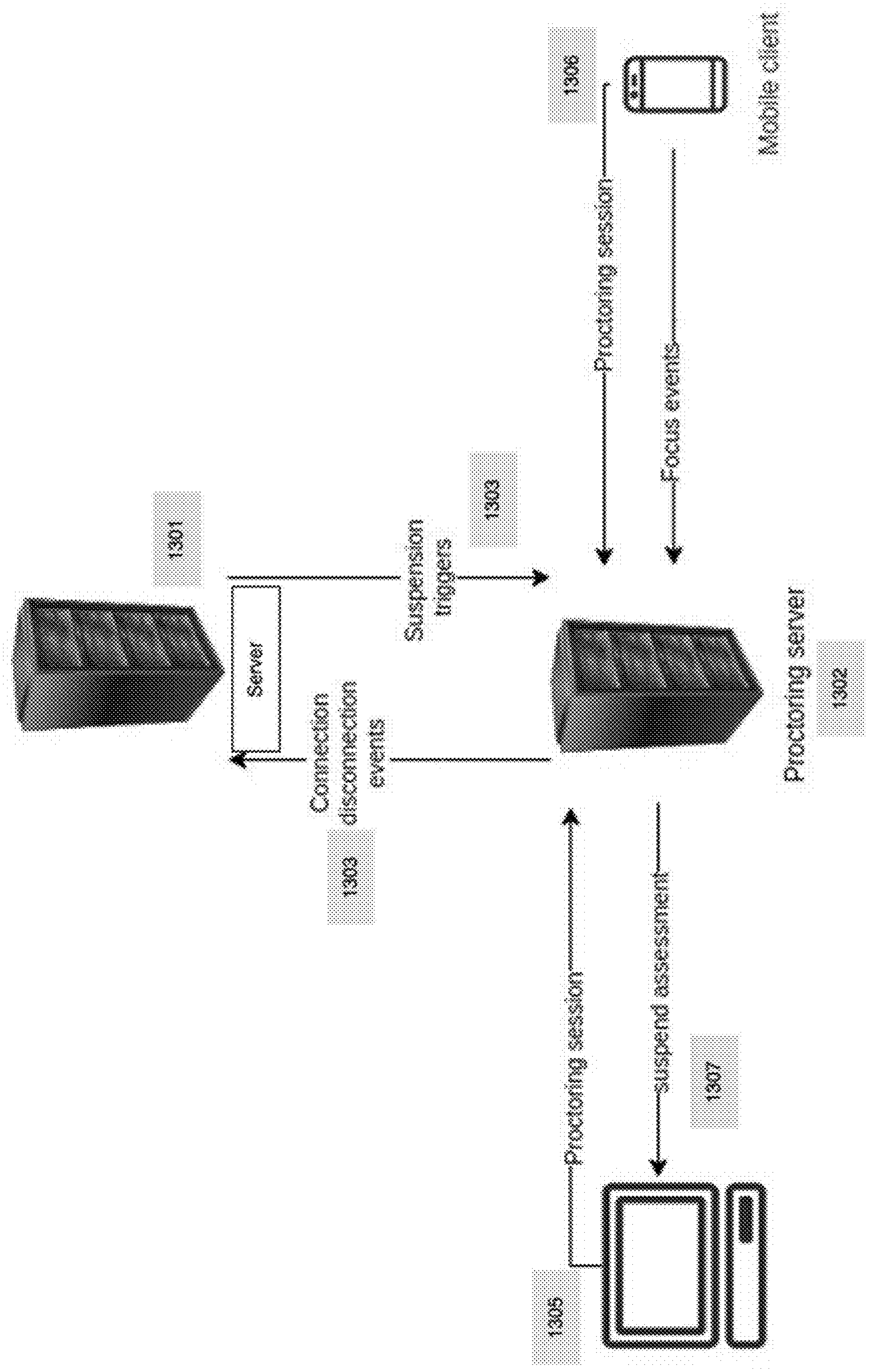

FIG. 13 show higher level architecture of servers which run assessments/tests with proctoring. The main server 1301 is where the tests will be conducted and which contains the business logic that handles and delivers tests. At the proctoring server 1302, this server handles the test proctoring activities. Video, Audio and cheating activities may also be recorded using the proctoring server.

At 1303, during operation, the server 1301 is in constant communication with the proctoring server 1302 and will alert the server if any proctoring disconnection events are triggered. If server identified any suspicious activity, then a test suspension event may be triggered.

At 1305, the proctoring session is maintained from the candidate test system/laptop. With regards to the mobile device 1306, the connections are maintained with and from an MDP application to the proctoring server to make sure that the mobile device is connected during the entire duration of test. At 1307, the assessment may be suspended, e.g., when the MDP session is not active or maintained.

Figure 12:
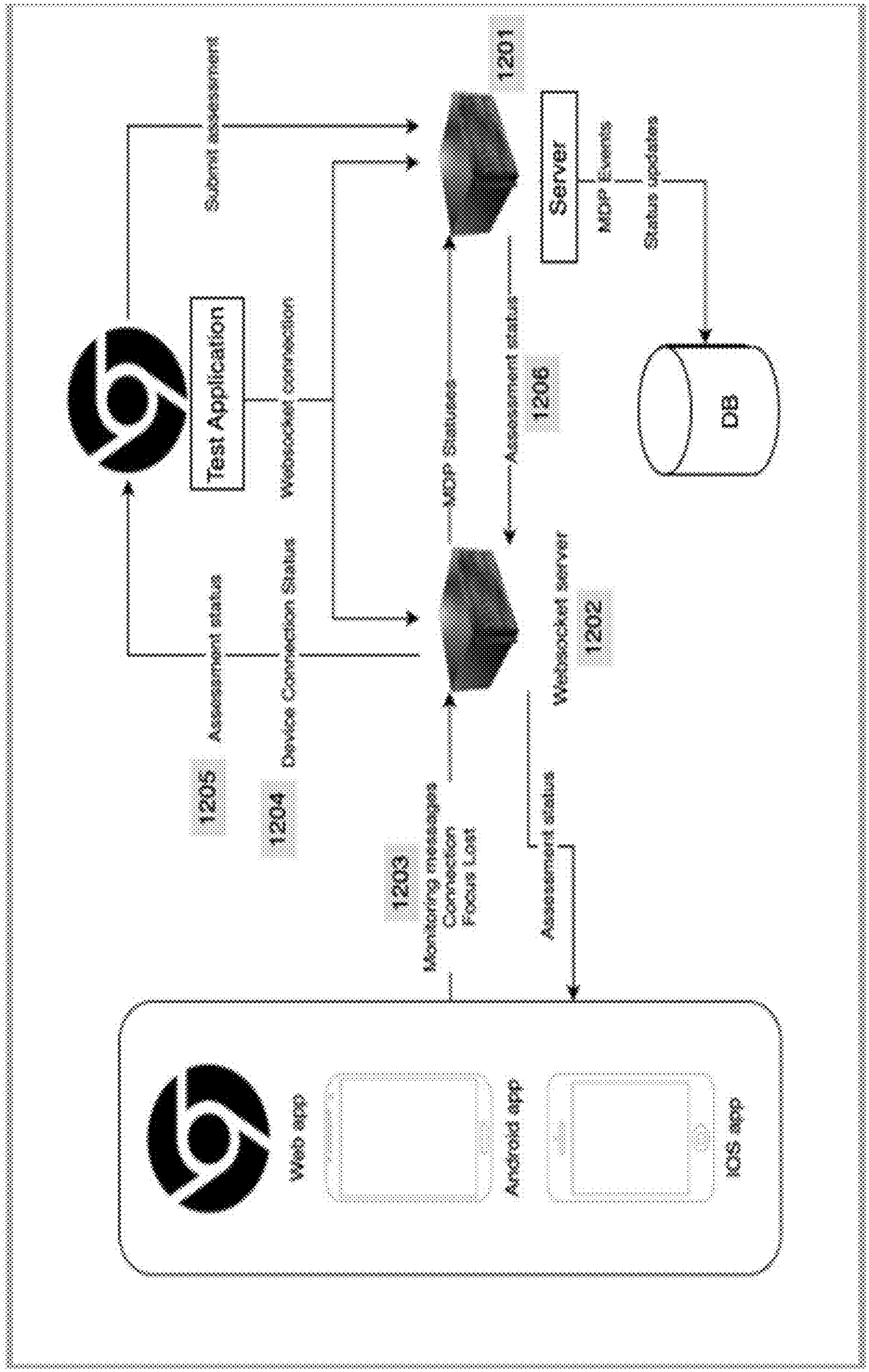
FIGS. 12 and 13 show system architecture diagrams according to some embodiments of the invention.

FIG. 12 shows a multi-device proctoring (MDP) architecture to implement session management according to some embodiments of the invention. This architecture also comprises rules that are built to handle MDP events.

Server 1201 (which may also be referred to herein the "Glider Server") is the the main application server that is responsible for running assessments (test) and will also collect any events triggered from both web applications and devices connected. The web application for the MDP may run on the user's mobile device (e.g., Android or IOS based mobile device, or in a mobile browser). The user is undergoing an assessment that is proctored by the test application that is connected to both the websocket server 1202 and the main server 1201.

The challenge addressed by this architecture is that when there are multiple devices connected to the server, there arises a problem of how maintain and manage communications between the components and to keep any necessary status information updated among all connections. The solution here is that when there is a trigger (such as a focus out on the mobile device away from the main proctoring screen), there is a possibility that the candidate can be cheating or searching for answers through the mobile browser. At this time, with some embodiments, the application server will be notified about this event, which will mark the candidate as suspicious and/or block the assessment with a warning.

The websocket server code at the websocket server 1202 will operate by having the socket server constantly poll between mobile (MDP) and web (test) to check whether both are in an active line of connection. The socket server will determine if any connection is lost in between the test and mobile device and will constantly provide an alert if this happens, e.g., alert the candidate to take the necessary corrective steps.

One potential issue is that due to possible Internet/connection fluctuations, the server will not be able to reach mobile devices, which may cause an erroneous detection of a Focus Out condition at the mobile device. Pinging is one possible approach to check for a connection to the mobile device, where a ping failure may be an indication of an unauthorized activity. To address the connection fluctuation issue, when a ping fails to reach the device, one or more of the following steps may be taken: (1) the socket server will wait for a time period (e.g., 30 seconds) to get a successful ping; (2) the buffer time will possibly provide enough leeway to help the device network to connect back.

At 1203, monitoring is performed by software code for monitoring connection focus. The challenge here is to keep the mobile device awake for the duration of the test, but prevent the candidate from using any other applications on the mobile device/phone during that time. If the candidate gets a call or opens a different app on the phone, action should be taken, e.g., where the candidate's browser session should get locked. The solution according to some embodiments is for an application page on a mobile browser in the mobile device to play a media file (such as an audio file) in a loop. This keeps the mobile device/phone awake while the candidate is busy taking the test on the desktop browser. In addition, the application page will continue to ping the server at regular intervals. If the browser application is interrupted due to an inbound call or if the candidate uses the phone for any other purpose, the pings to the server will be interrupted. This will flag the candidate's assessment session as possibly corresponding to unauthorized activity on the mobile device.

At 1204, device connection statuses are generated and communicated between components in the architecture, e,g, between the websocket server 1202 and the test/proctoring application. A rules module may be used to implement rules to collect and analyze MDP events that occurs in the architecture, to manage sessions across multiple devices, and to generate the appropriate status information.

With regards to the device being connected, during the start of an assessment for a connection for a first time, a candidate connects the device to the server with a passcode. During this event, the server will mark the device as being connected. In between an assessment, when the candidate tries to reconnect the device to the assessment (e.g., due to a disconnect), the server performs one or more of the following checks and validations: (i) configure time taken to connect back to the assessment—e.g., where a default threshold is 10 seconds; (ii) configure number of times the candidate has left the assessment—e.g., where a default threshold is three times; (iii) determine if time from (i)>configured threshold time, and if so, then a suspicious flag will be marked; (iv) If the number of times from (ii)>configured threshold, then the assessment will be terminated, and the candidate will be disqualified; (v) configured default thresholds can be configured during the test/assessment creation.

With regards to a device being disconnected, this disconnection of the device can be due to any number of reasons. For example, the connection may have closed which is detected immediately, e.g., a tab closed, and/or the mobile device suspends background activity of browser/app. If this occurs, the server will start a suspicious clock, where if the suspicious clock hits a disconnected limit value (e.g., with a default of 5 minutes, but which may be changed in assignment configurations), then the assessment will be suspended. In addition, Internet/connection fluctuations may occur. This happens, for example, when the websocket connection times out, and can be set to a configured time setting such as 10 seconds. If the device connects back before the time setting (e.g., connects back within 10 seconds), then no event will be logged.

The browser itself can also be checked to determine a browser connected status or a browser disconnected status. In addition, a check can be made of the device being in a "Focus In" or "Focus Out" status. In some embodiments, the device Focus In check is performed by connection to the server and checking for a websocket timeout period (e.g., as described above for the Internet/connection fluctuation case). In some embodiments, the device Focus Out check is performed where this event is detected and sent by the mobile front end. Once the focus out event is received, the database is updated to save this status. A suspicious event threshold may be started, and a pop-up is shown in the browser. If the threshold is crossed for the designated time period (e.g., 5 minutes), then the assessment may be suspended.

Assessment status data may be derived and communicated at 1205 and 1206. For example, the assessment may be paused, where this event is used to track if the candidate is choosing to exit the assessment temporarily. On using the exit button, the MDP system will not take disconnection as a suspicious event. For an assessment submit event, this event will end the MDP device session and/or end of the test.

As previously noted, an assessment configuration can be implemented for a session. While setting up the assessment/test, a user hiring manager/recruiter can set the configuration for various items. For example, a threshold can be configured for how many times session disconnection should be permitted. In addition, a configuration can be set for how long a candidate can stay away from the session.

There are numerous types of unauthorized activities which may correspond to possible "cheating". Such unauthorized activities may include for example, (a) calling someone for help; (b) taking a picture or sharing questions to friends/networks in social networking application; and/or (c) searching in a mobile browser for answers.

Figure 14:
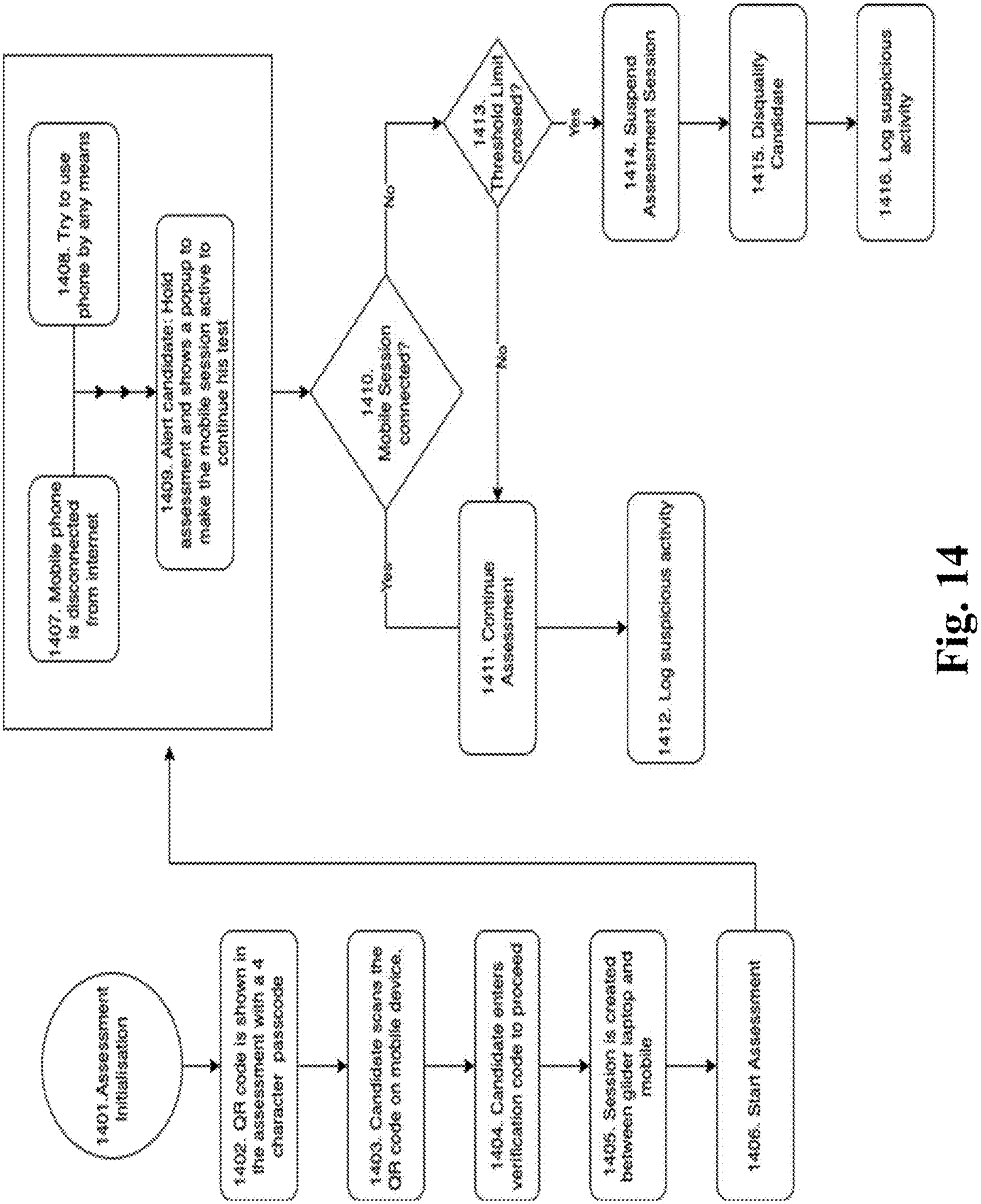
FIG. 14 shows a flow diagram for certain processing actions according to some embodiments of the invention.

FIG. 14 shows a flow diagram for certain processing actions according to some embodiments of the invention. At 1401, assessment initialization is performed. This may be implemented, for example, by having the recruiter share an assessment link to the candidate. The candidate can start the assessment by clicking the link shared in the invite. The candidate then enters requested basic information and confirms proctoring settings. The next step is then set to the multi-device proctoring mode.

At 1402, QR code processing is performed. A QR code with a 4-character passcode is shown on the final step of assessment configuration. The candidate will be requested to scan the QR code before starting the assessment.

At 1403, the candidate will then scan the QR code. This will open a browser URL, and the candidate will then need to enter the 4 characters at 1404. Once successfully validated, the candidate will continue the assessment.

At 1405, on successful passcode validation, the session is created between candidate browser assessment and candidate's mobile device. Thereafter, at 1406, the candidate can start taking assessment question.

The assessment attempt will now proceed. At 1407, once session is connected, the candidate should not use phone. At 1408, a determination is made whether the candidate is attempting to use the mobile device, and corrective action is taken if detected. For example, the session may be disconnected for one or more of the following reasons: (a) Candidate MDP app on mobile device indicates unauthorized activity; (b) Mobile device network is disconnected. At 1409, the candidate assessment attempt will be blocked based upon the appropriate indication from 1407 or 1408.

A determination is made at 1410 whether the mobile session is connected. During the candidate attempt, if the mobile session is disconnected within a system threshold limit, then the candidate will be allowed to continue assessment at 1411 when the session is connected back. It is noted that, at 1412, disconnections will be logged in a candidate activity report as a possibly suspicious activity.

A determination is made at 1413 whether the mobile session disconnect is beyond a system threshold that was configured. If not, then the assessment is continued at 1411. However, if it is beyond the configured threshold, then the candidate attempt will be terminated at 1414. At 1415, the candidate attempt will be marked as disqualified, and at 1416, the possibly suspicious activity will be logged in the candidates' assessment report.

Figure 15:
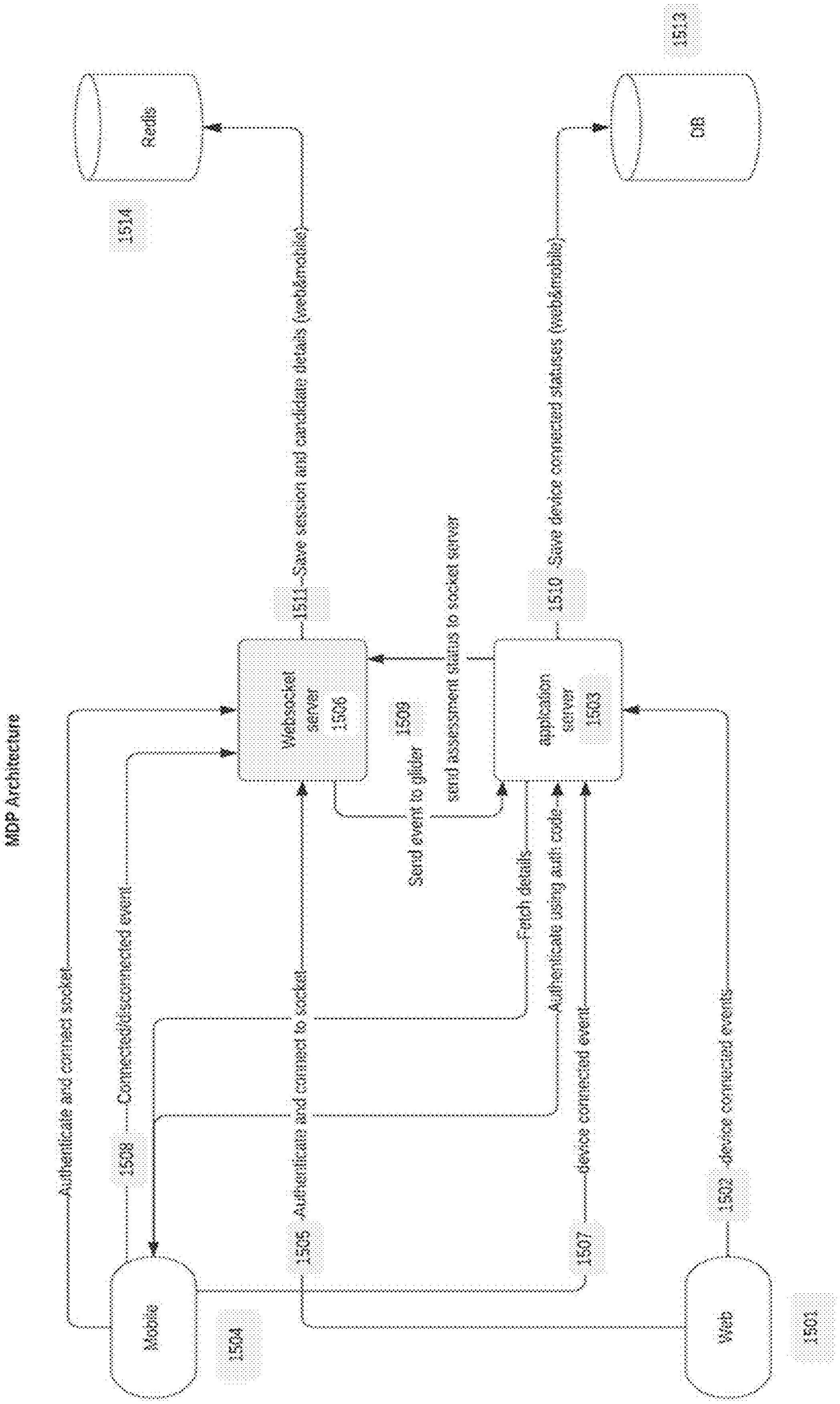
FIG. 15 provides an illustration of certain components used to keep the device, web browser, and servers in sync involving socket connections through socket servers.

FIG. 15 provides an illustration of certain components in the MDP architecture used to keep the device, web browser, and servers in sync involving socket connections through socket servers. Through the web browser 1501, the user/candidate will start taking the assessment/test. Once the user starts, the device connection events are passed to the main processing server 1503.

The following will describe connection events that will be passed during each stage of the assessment. During each stage of the events, appropriate messages will be shown to the user as well.

At 1502, device connected events to the server are processed. Such events include, for example, the following: (a) "ASSIGNMENT_PAUSED": show the 'Assessment-Paused' screen with the respective message; (b) "ASSIGNMENT_SUBMITTED": show the 'AssessmentSubmitted' screen with the respective message; (c) "ASSESSMENT_SUSPENDED": show the 'AssessmentSuspended' screen with the respective message; (d) "BROWSER_DISCONNECTED"/"BROWSER_CLOSE_CONNECTION": show a toast message, "Assessment not connected."; (e) "BROWSER_CONNECTED": if it is received after "BROWSER_DISCONNECTED"/"BROWSER_CLOSE_CONNECTION," remove the message, else, ignore the event; (f) "UPDATE_STATUS": if message.status.browserStatus.status=="not-connected," show a toast message, "Assessment not connected."

The main server that monitors assessments is server 1503. Tests and question delivery are controlled by server 1503. Once a user starts the assessment/test, the server verifies and validates the request and saves the connected status state to the database 1513.

At 1504, once the web is connected and validated, the user will be asked to connect the mobile device with an authorization code (e.g., 4 digit code) which will be displayed in the web browser. This authorization code is used to authenticate/verify if the same candidate who is taking test has joined through the mobile device as well. The steps and validation actions once the device is connected may include, for example: (a) authenticate the session using the four-digit auth code entered by the candidate, and where the auth details are returned—where this data is saved in the database 1513; (b) create a new proctoring session, where assessment details are returned; and/or (c) fetch the assessment status (e.g., evaluated/completed/submitted).

At 1505, websocket authentication is performed. After the proctoring session is initiated for creation, a websocket connection is made from the MDP app. This connection is authenticated, and on successful authentication, a "DEVICE_CONNECTED" event is sent to the websocket server. The session ID, along with candidate details, is saved in Redis.

The websocket server 1506 is implemented to track device connection/disconnection events and to notify the user when the device is out of focus. It handles the constant connection between the web app/native app, and a database (e.g., a Redis DB 1514) saves the session and session details. From the websocket server, API calls are made to the server 1503 to notify connected/disconnected events and to save those events in the database 1513.

Figure 16:
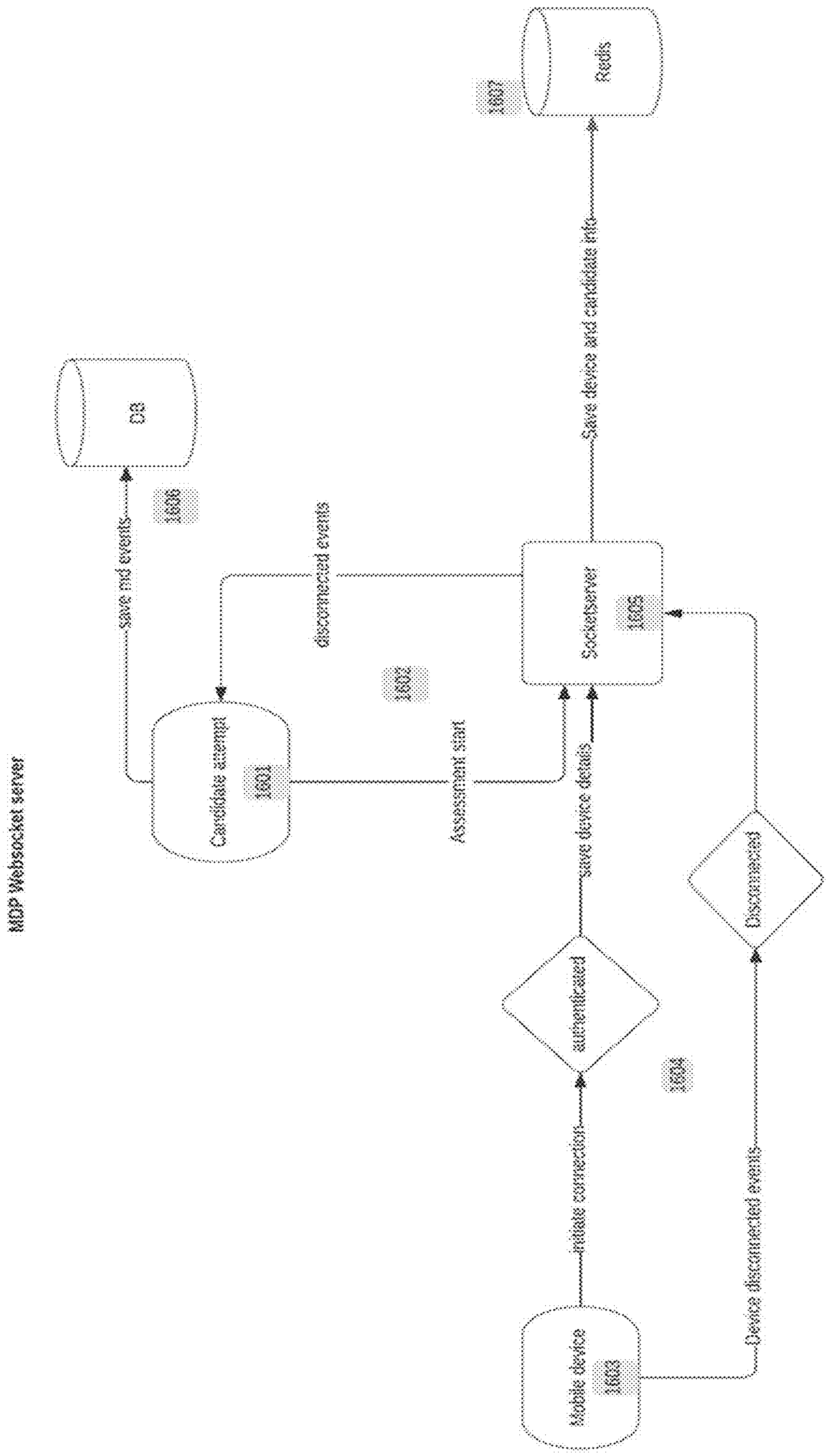
FIG. 16 shows a detailed diagram of the socket server operations.

FIG. 16 shows a detailed diagram of the socket server operations. At 1601, when user joins the test, a start event is passed at the same time to the websocket server 1605 which make sure if the mobile device is also connected throughout the journey of the test. At 1602, as mentioned above, different set of events are maintained in 1606 and make sure that whenever the device is disconnected, appropriate messages are shown and possible blocking of the test until the time the device is connected. At 1603, the websocket connection is initiated from the mobile device which will be authenticated and a session ID is created and saved maintained in a cache database 1607 (e.g., a Redis database). The cache database is used to provide faster access to immediately required data that is used by components and servers within the architecture, and may be implemented using storage or access mechanisms that facilitate such faster access, e.g., using a fast storage tier such as memory or solid state devices (SSDs). At 1604, a set of device events are handled (which is explained with respect to 1508).

Returning back to FIG. 15, device connected events correspond to 1507. The web app, during a candidate attempt, calls an authentication API in the websocket server. Upon receiving a successful response, the app-connected event is saved in the server database. The MDP application (web/native mobile app) calls an API to the server when the candidate enters the unique authentication code displayed in the web app. On success, the MDP app will attempt to connect to the websocket server, and the session ID, along with candidate details, are saved in the database.

1508 corresponds to webwocket device events, which may include for example: (a) DEVICE_CONNECTED: on successful webwocket authentication, this event is sent to the server with the current date and time; (b) DEVICE_FOCUS_OUT: if the candidate minimizes the app, enables split-screen or attends a phone call, this event is sent with the current date and time; (c) DEVICE_FOCUS_IN: if the assessment status is "in-progress," and the candidate comes back to the MDP screen after minimizing or attending phone calls, this event is sent with the current date and time.

Websocket and other proctoring connection(s) correspond to 1509. Server events are sent to the websocket server via an active socket connection. This is then sent to the MDP application if the receiver ID is also passed to the websocket server. Websocket events are sent to the server via a public API, and saved as multi-device events in the database.

At 1510, device statuses are saved in the DB (shown at, 1513). Candidate details for the current assessment are saved in a collection in the DB. For every event received from the websocket server and the candidate attempt web app, it is saved along with the current date and time. This is used to determine the number of times a candidate has used the device.

At 1511, the system will save session and candidate details in the cache database (e.g., a Redis DB 1514). Once the websocket authentication is successful, a key is created which has the session ID Therefore, what has been described is an improved approach to implement online assessment mechanisms which would preclude or minimize unauthorized activities using as mobile device during an assessment. With embodiments of the invention, the user/candidate of an assessment session is blocked from accessing unauthorized mobile applications or mobile activities. For the assessment duration, the user is expected to stay on a specific page on the mobile device that is connected to the assessment session on the laptop. Any attempt to move out of the active page on the mobile device will trigger a warning message on the live ongoing assessment session on the laptop, generate a record of the activity in a database, and/or cause the assessment session to terminate.

System Architecture Overview

Figure 17:
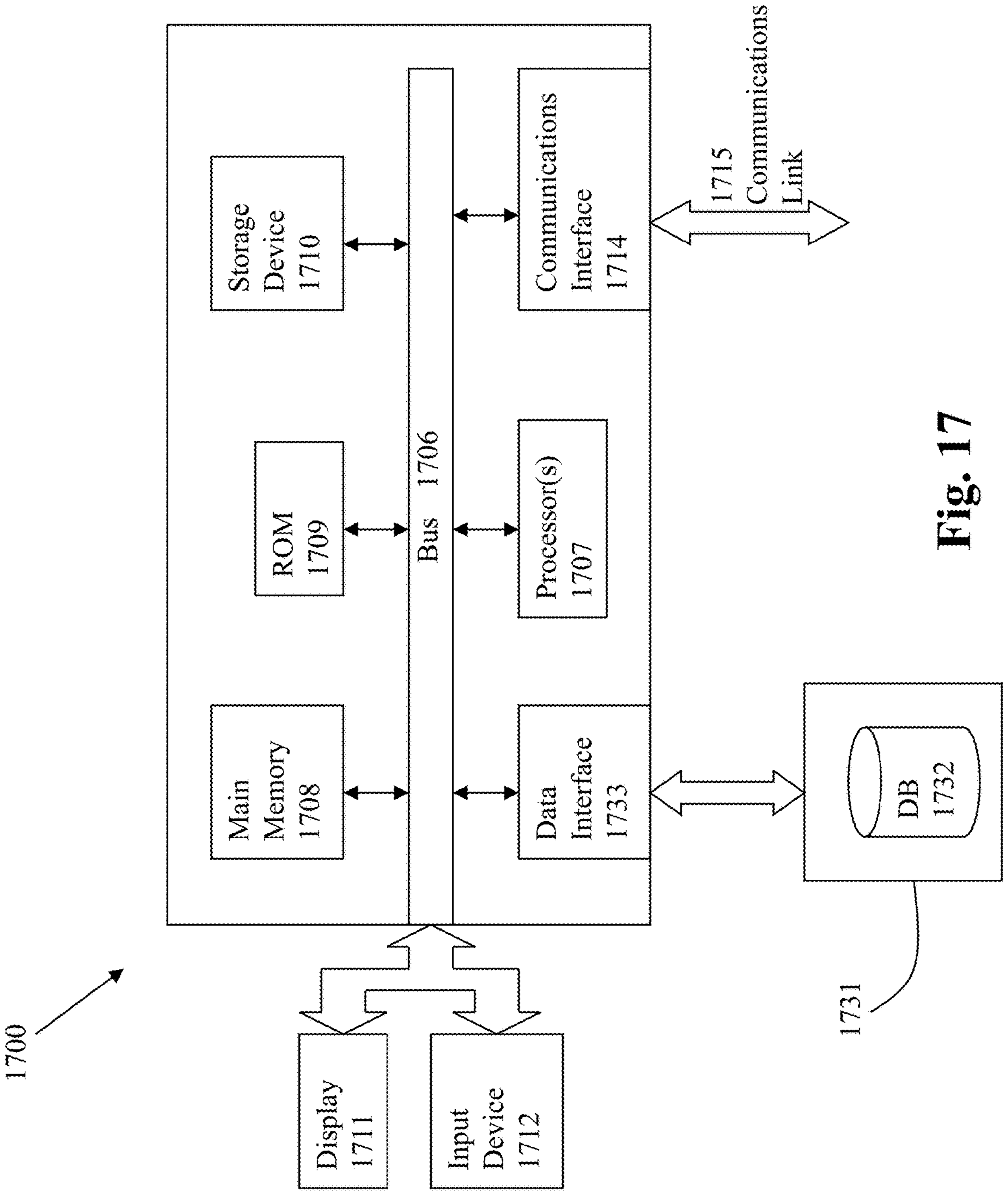
FIG. 17 depicts a computerized system on which some embodiments of the invention can be implemented.

FIG. 17 is a block diagram of an illustrative computing system 1700 suitable for implementing an embodiment of the present invention. Computer system 1700 includes a bus 1706 or other communication mechanism for communicating information, which interconnects subsystems and devices, such as processor 1707, system memory 1708 (e.g., RAM), static storage device 1709 (e.g., ROM), disk drive 1710 (e.g., magnetic or optical), communication interface 1714 (e.g., modem or Ethernet card), display 1711 (e.g., CRT or LCD), input device 1712 (e.g., keyboard), and cursor control.

According to one embodiment of the invention, computer system 1700 performs specific operations by processor 1707 executing one or more sequences of one or more instructions contained in system memory 1708. Such instructions may be read into system memory 1708 from another computer readable/usable medium, such as static storage device 1709 or disk drive 1710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1707 for execution. Such a medium may take many forms, including but not limited to, non-volatile media and volatile media. Non-volatile media includes, for example, optical or magnetic disks, such as disk drive 1710. Volatile media includes dynamic memory, such as system memory 1708. A database 1732 may be accessed in a computer readable medium 1731 using a data interface 1733.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1700. According to other embodiments of the invention, two or more computer systems 1700 coupled by communication link 1715 (e.g., LAN, PTSN, or wireless network) may perform the sequence of instructions required to practice the invention in coordination with one another.

Computer system 1700 may transmit and receive messages, data, and instructions, including program, i.e., application code, through communication link 1715 and communication interface 1714. Received program code may be executed by processor 1707 as it is received, and/or stored in disk drive 1710, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer implemented method, comprising:

implementing an online session in a system comprising an application server and a websocket server;

pairing a mobile device with the online session that is run on the user computing station, wherein the pairing is performed by opening a screen page in a browser or installing an application on the mobile device, the mobile device is blocked from accessing unauthorized applications during the online session of the user computing station, and the mobile device plays a media file in a loop to keep the mobile device awake for the online session;

checking for an unauthorized activity on the mobile device while the online session is active on the user computing station, wherein the websocket server performs polling to check for an active line of connection between the mobile device and the application server, and absence of the active line of connection corresponds to the unauthorized activity wherein pinging is performed to check for the active line of connection to the mobile device using a buffer time period to provide time to connect back in the event of a connection fluctuation, and wherein a websocket connection is initiated from the mobile device that corresponds to a session ID that is created and saved in a cache database for faster access to the session ID, and checking is performed to identify the unauthorized activity based at least in part upon checking for a number of times the user has left a lock page on the mobile device; and taking an action if the unauthorized activity is detected, wherein the action comprises at least one of blocking the unauthorized activity on the mobile device, flagging the unauthorized activity, or ending the online session.

2. The method of claim 1, wherein a QR code is used to pair the mobile device with the online session.

3. The method of claim 1, wherein the unauthorized activity on the mobile device comprises a movement away from a specific active page on the mobile device to another page or another application.

4. The method of claim 1, wherein a trigger corresponding to at least one of a Focus In or a Focus Out on the mobile device is used to initiate an event corresponding to the unauthorized activity.

5. The method of claim 1, wherein the absence of the active line of connection that corresponds to possible unauthorized activity is checked for erroneous detection due to connection fluctuations by implementing a wait time period.

6. The method of claim 1, wherein the media file that is played in the loop to keep the mobile device awake comprises an audio file.

7. The method of claim 1, wherein a set of rules are implemented to manage event processing for detecting the unauthorized activity on the mobile device, where the set of rules corresponds to a connection status of the mobile device.

8. A non-transitory computer program product embodied on a computer usable medium, the non-transitory computer readable medium having stored thereon a sequence of instructions which, which is executable by the processor to execute actions comprising: implementing an online session in a system comprising an application server and a websocket server; pairing a mobile device with the online session that is run on the user computing station, wherein the pairing is performed by opening a screen page in a browser or installing an application on the mobile device, the mobile device is blocked from accessing unauthorized applications during the online session of the user computing station, and the mobile device plays a media file in a loop to keep the mobile device awake for the online session; checking for an unauthorized activity on the mobile device while the online session is active on the user computing station, wherein the websocket server performs polling to check for an active line of connection between the mobile device and the application server, and absence of the active line of connection corresponds to the unauthorized activity wherein pinging is performed to check for the active line of connection to the mobile device using a buffer time period to provide time to connect back in the event of a connection fluctuation, and wherein a websocket connection is initiated from the mobile device that corresponds to a session ID that is created and saved in a cache database for faster access to the session ID, and checking is performed to identify the unauthorized activity based at least in part upon checking for a number of times the user has left a lock page on the mobile device; and taking an action if the unauthorized activity is detected, wherein the action comprises at least one of blocking the unauthorized activity on the mobile device, flagging the unauthorized activity, or ending the online session.

9. The non-transitory computer program product of claim 8, wherein a QR code is used to pair the mobile device with the online session.

10. The non-transitory computer program product of claim 8, wherein the unauthorized activity on the mobile device comprises a movement away from a specific active page on the mobile device to another page or another application.

11. The non-transitory computer program product of claim 8, wherein a trigger corresponding to at least one of a Focus In or a Focus Out on the mobile device is used to initiate an event corresponding to the unauthorized activity.

12. The non-transitory computer program product of claim 8, wherein the absence of the active line of connection that corresponds to possible unauthorized activity is checked for erroneous detection due to connection fluctuations by implementing a wait time period.

13. The non-transitory computer program product of claim 8, wherein the media file that is played in the loop to keep the mobile device awake comprises an audio file.

14. The non-transitory computer program product of claim 8, wherein a set of rules are implemented to manage event processing for detecting the unauthorized activity on the mobile device, where the set of rules corresponds to a connection status of the mobile device.

15. A computer-based system, comprising:

a computer processor to execute a set of program code instructions;

a memory to hold the program code instructions, in which the program code instructions comprises program code for implementing an online session in a system comprising an application server and a websocket server; pairing a mobile device with the online session that is run on the user computing station, wherein the pairing is performed by opening a screen page in a browser or installing an application on the mobile device, the mobile device is blocked from accessing unauthorized applications during the online session of the user computing station, and the mobile device plays a media file in a loop to keep the mobile device awake for the online session; checking for an unauthorized activity on the mobile device while the online session is active on the user computing station, wherein the websocket server performs polling to check for an active line of connection between the mobile device and the application server, and absence of the active line of connection corresponds to the unauthorized activity wherein pinging is performed to check for the active line of connection to the mobile device using a buffer time period to provide time to connect back in the event of a connection fluctuation, and wherein a websocket connection is initiated from the mobile device that corresponds to a session ID that is created and saved in a cache database for faster access to the session ID, and checking is performed to identify the unauthorized activity based at least in part upon checking for a number of times the user has left a lock page on the mobile device; and taking an action if the unauthorized activity is detected, wherein the action comprises at least one of blocking the unauthorized activity on the mobile device, flagging the unauthorized activity, or ending the online session.

16. The system of claim 15, wherein a QR code is used to pair the mobile device with the online session.

17. The system of claim 15, wherein the unauthorized activity on the mobile device comprises a movement away from a specific active page on the mobile device to another page or another application.

18. The system of claim 15, wherein the absence of the active line of connection that corresponds to possible unauthorized activity is checked for erroneous detection due to connection fluctuations by implementing a wait time period.

19. The system of claim 15, wherein the media file that is played in the loop to keep the mobile device awake comprises an audio file.

20. The system of claim 15, wherein a set of rules are implemented to manage event processing for detecting the unauthorized activity on the mobile device, where the set of rules corresponds to a connection status of the mobile device.

* * * * *